(12) United States Patent
Sääsk

(10) Patent No.: US 9,861,936 B2
(45) Date of Patent: Jan. 9, 2018

(54) DEVICE FOR MEMBRANE DISTILLATION

(71) Applicant: AB SCARAB DEVELOPMENT, Stockholm (SE)

(72) Inventor: Aapo Sääsk, Stockholm (SE)

(73) Assignee: AB SCARAB DEVELOPMENT, Stockholm (SE)

( * ) Notice: Subject to any disclaimer, the term of this patent is extended or adjusted under 35 U.S.C. 154(b) by 173 days.

(21) Appl. No.: 14/907,278

(22) PCT Filed: Aug. 6, 2014

(86) PCT No.: PCT/SE2014/050916
§ 371 (c)(1),
(2) Date: Jan. 23, 2016

(87) PCT Pub. No.: WO2015/020597
PCT Pub. Date: Feb. 12, 2015

(65) Prior Publication Data
US 2016/0158702 A1    Jun. 9, 2016

(30) Foreign Application Priority Data

Aug. 8, 2013   (SE) .................................. 1350939-3

(51) Int. Cl.
*B01D 61/36* (2006.01)
*B01D 63/08* (2006.01)

(52) U.S. Cl.
CPC ......... *B01D 61/366* (2013.01); *B01D 61/364* (2013.01); *B01D 63/082* (2013.01);
(Continued)

(58) Field of Classification Search
CPC ... B01D 61/366; B01D 61/364; B01D 63/082
See application file for complete search history.

(56) References Cited

U.S. PATENT DOCUMENTS 4,391,676 A    7/1983   Torberger

FOREIGN PATENT DOCUMENTS

EP    1925355 A1    5/2008
JP    6019705 A     10/1985

OTHER PUBLICATIONS

Andersson, et al., "Design and Field Tests of a New Membrane Distillation Desalination Process," Desalination, 56 (1985) pp. 345-354.

(Continued)

*Primary Examiner* — Chester T Barry
(74) *Attorney, Agent, or Firm* — Tucker Ellis LLP

(57) ABSTRACT

Device for producing pure water, where the water to be purified is caused to be membrane distilled using one or more units (1), wherein each of the units comprises a space which on its one side comprises a first disc-shaped wall (4,4') and on its other side a membrane (3,3') through which gaseous water can pass but not liquid water, and a second disc-shaped wall (5,10), which walls are disposed on different sides of and at a distance from the membrane, wherein water is led in between the first wall (4,4') and the membrane (3,3'), and wherein the second wall (5,10) is caused to be colder than the water. The invention is characterized in that the first disc-shaped wall (4,4') is also a membrane through which gaseous water can pass but not liquid water, in that two adjacent membranes (3, 4; 3' 4') are supported by a common frame (6), in that the space between the membranes is provided with an inlet opening (7,7') for water to be purified and an outlet opening (8,8'), in that the second wall (5,10) is a part of a chamber (9) formed by two parallel walls, in that the chamber is provided with an inlet opening (11,11') for water which is colder than the water to be purified and provided with an outlet opening (12,12'), and in (Continued)

that chambers (9,9') are arranged in parallel with the membranes at both sides of the frame (6).

4 Claims, 1 Drawing Sheet

(52) U.S. Cl.
CPC ...... *B01D 2313/20* (2013.01); *B01D 2313/22* (2013.01); *B01D 2313/50* (2013.01)

(56) References Cited

OTHER PUBLICATIONS

International Search Report from corresponding International Patent Application No. PCT/SE2014/050916, dated Oct. 21, 2014.
International Preliminary Report on Patentability from corresponding International Patent Application No. PCT/SE2014/050916, dated Oct. 28, 2015.

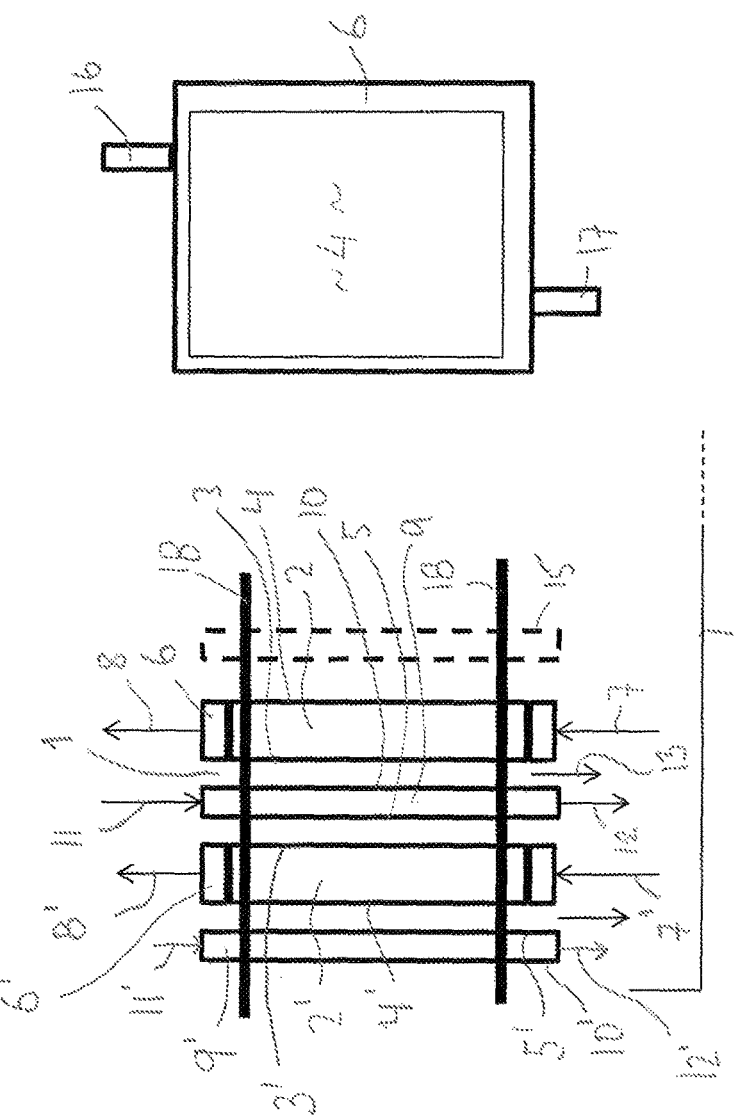

DEVICE FOR MEMBRANE DISTILLATION

The present invention relates to a device for membrane distillation.

In many parts of the world, there is a lack of access to clean water. There are known devices to purify water from pollutants.

One such device is a device for membrane distillation. Membrane distillation, so-called MD, has been known since the 1980s for purifying water. A membrane distillation device is a device comprising a number of parallel disc-shaped membrane distillation units. Each unit comprises a first water-impermeable disc, a membrane in parallel to the disc and a second water-impermeable disc in parallel to the membrane. Water can only pass through the membrane in gaseous form, in other words water in vapor phase. Between the first disc and the membrane, there is flow of warm water. The second disc is colder than the flowing water. The temperature difference between the water and the colder disc causes the water to evaporate, to pass the membrane and to condense on the other, colder wall. The surface tension of the water results in that the water cannot penetrate the membrane. In the Swedish patent number 8002233-8, such a membrane distillation unit is disclosed.

Membrane distillation can be used in many fields, using which all non-volatile substances, except pure water, will remain in the water to be purified. The condensed water will thus be free from salts, particles, bacteria, viruses, etc.

A membrane distillation device consists of a number of said units disposed in parallel with each other. The adjacent units are held together by an outer frame.

When a membrane breaks, water to be purified leaks through the membrane and into the purified water. Therefore, a damaged membrane needs replacement. This means that the membrane distillation device must be disassembled in order to replace the failed unit, and then again be reassembled. This is cumbersome and time consuming.

The present invention solves this problem.

Hence, the present invention relates to a device for producing pure water, where the water to be purified is caused to be membrane distilled using one or more units, wherein each of the units comprises a space which on its one side comprises a first disc-shaped wall and on its other side a membrane through which gaseous water can pass but not liquid water, and a second disc-shaped wall, which walls are disposed on different sides of and at a distance from the membrane, wherein water is led in between the first wall and the membrane, and wherein the second wall is caused to be colder than the water, and is characterized in that the first disc-shaped wall is also a membrane through which gaseous water can pass but not liquid water, in that two adjacent membranes are supported by a common frame, in that the space between the membranes is provided with an inlet opening for water to be purified and an outlet opening, in that the second wall is a part of a chamber formed by two parallel walls, in that the chamber is provided with an inlet opening for water which is colder than the water to be purified and provided with an outlet opening, and in that chambers are arranged in parallel with the membranes at both sides of the frame.

Below, the invention is described in closer detail, partly in connection with an embodiment of the invention illustrated in the accompanying drawings, wherein FIG. 1 illustrates a membrane distillation device according to the invention FIG. 2 shows a membrane unit in a plane view.

In FIG. 1, a device is shown for producing pure water, where the water to be purified is caused to be membrane distilled using one or more units 1, wherein each of the units comprises a space 2 which on its one side comprises a first disc-shaped wall 4 and on its other side a membrane 3, through which gaseous water can pass but not liquid water, as well as a second disc-shaped wall 5, which walls 4, 5 are disposed on different sides of and at a distance from the membrane 3, wherein water is led in between the first wall 4 and the membrane 3, and wherein the second wall 5 is caused to be colder than the water.

According to the invention, the first disc-shaped wall 4 is also a membrane through which gaseous water can pass but not liquid water. The membranes 3, 4 are supported by a common frame 6. The space 2 between the membranes 3, 4 is provided with an inlet opening for water to be purified and an outlet opening for water. In FIG. 1, the inlet opening is illustrated by an arrow 7 and the outlet opening by an arrow 8.

In FIG. 1, a corresponding unit is shown to the left, wherein the reference numerals are the same but provided with an apostrophe. As shown in FIG. 1, the frames 6, 6' with the membranes are arranged at a distance from each other so that a space is formed between the frames 6, 6'.

The second wall 5 is a part of a chamber 9, formed by two parallel walls 5, 10. The chamber 9 is provided with an inlet opening for water which is colder than the water to be purified and provided with an outlet opening. In FIG. 1, the inlet opening is illustrated by an arrow 11, and the outlet opening by an arrow 12.

The chamber 9 is arranged in the said space between the frames 6, 6', in parallel with the membranes 3, 3'.

The dashed chamber 15 in FIG. 1 illustrates that additional chambers and additional frames with membranes can be arranged alternately in relation to each other, so that the membrane distillation device may include multiple chambers and frames with membranes.

With reference to the frame 6, to the right in FIG. 1, water to be purified is hence led in between the membranes 3, 4. Furthermore, cooler water is led into the chamber 9. Because the chamber wall 10 therefore is cooler than the water to be purified, water in gaseous phase passes through membrane 3 and condenses on a wall of the chamber 10. The condensed water pours down, as illustrated by the arrow 13, down onto a collection trough 14 for purified water. The colder water can be cooled and/or the warmer water to be purified can be heated.

Due to the location between two frames 6, 6' with membranes, water vapor passing the membrane 3' will also condense on the wall of the chamber 9 shown to the left in the figure.

The chambers 9 are preferably made of sheet metal, in order to obtain high thermal conductivity. The frames can each be formed in a plastic material or any other suitable material with low thermal conductivity, in order to prevent the water to be purified from being cooled by the environment.

The chambers 9 and the frames 6 with membranes are suitably held together by a frame 18 running around the membrane distillation device. The frame 18 is designed so that there is some play between each frame 6 and the chambers 9 arranged on either side of the frame 6. This results in that, when a membrane breaks, the frame 6 can be released from the water supply and easily be lifted out from the membrane distillation device without affecting the other frames or chambers 9.

In FIG. 2, an inlet opening 16 and an outlet opening 17 to the space between the membranes 3, 4 are shown. In the corresponding way, each chamber is provided with respective inlet and outlet openings.

Each chamber may be separately connected to a water circuit or may be connected in series or in parallel to a common water circuit. Frames with the membranes may also be individually connected to a water circuit containing water to be purified or be connected in series or in parallel to a common water circuit.

According to a preferred embodiment, the two membranes 3, 4 are supported by the said frame 6, to which the membranes are attached so that a closed space is formed, into which said inlet opening 16 and outlet opening 17 are connected.

According to another preferred embodiment, the said chamber 9 is formed by said two parallel walls 5, 10, that are attached to one another along their periphery so that a closed space is formed, to which the said inlet opening 11 and outlet opening 12 are connected.

According to a further embodiment, two or more chambers 9 are disposed in parallel to each other, and at a distance from each other corresponding to the width of the said frame 6 supporting the membranes 3, 4.

According to a further preferred embodiment, the frame 6 with the membranes is removably inserted between two adjacent chambers 9.

It is apparent that the present invention solves the initially mentioned problem.

Above, a number of embodiments have been described. However, the chambers 9 and the frames 6 with the membranes may be designed differently without departing from the function of the device.

The invention claimed is:

1. Device for producing pure water, where the water to be purified is caused to be membrane distilled using a plurality of units, wherein each of the units comprises a space which on its one side comprises a first disc-shaped wall and on its other side is a membrane that is adjacent to and spaced apart from a second disc-shaped wall through which gaseous water can pass but not liquid water, said second disc-shaped wall, having walls disposed on different sides of and at a distance from the membrane, wherein water is led in between the first wall and the membrane, and wherein the second wall is colder than the water to be purified, where the first disc-shaped wall also is a membrane through which gaseous water can pass but not liquid water, where the two adjacent membranes are supported by a common frame, where the space between the two adjacent membranes is provided with an inlet opening for receiving water to be purified into the space and an outlet opening, where the second wall defines in part a chamber formed by two parallel walls associated with the second wall, where the chamber is provided with a chamber inlet opening for receiving cooler water which is colder than the water to be purified and provided with a chamber outlet opening, where two of such chambers are arranged in parallel with the two adjacent membranes, wherein the frame with the two adjacent membranes is removably inserted between the two chambers.

2. Device according to claim 1, wherein the two membranes are supported by and fastened to the frame, so that said space is enclosed and to which frame the inlet opening of the space and outlet opening of the space are connected.

3. Device according to claim 1, wherein each of the chambers is formed by its respective two parallel walls which are fastened to each other along their periphery so that an enclosed space is formed, to which the chamber inlet opening and chamber outlet opening are connected.

4. Device according to claim 1, wherein the distance between said two chambers corresponds to the width of the frame.

* * * * *